April 17, 1962  C. D. PALMER  3,029,541
DECOY
Filed Feb. 26, 1959  2 Sheets-Sheet 1
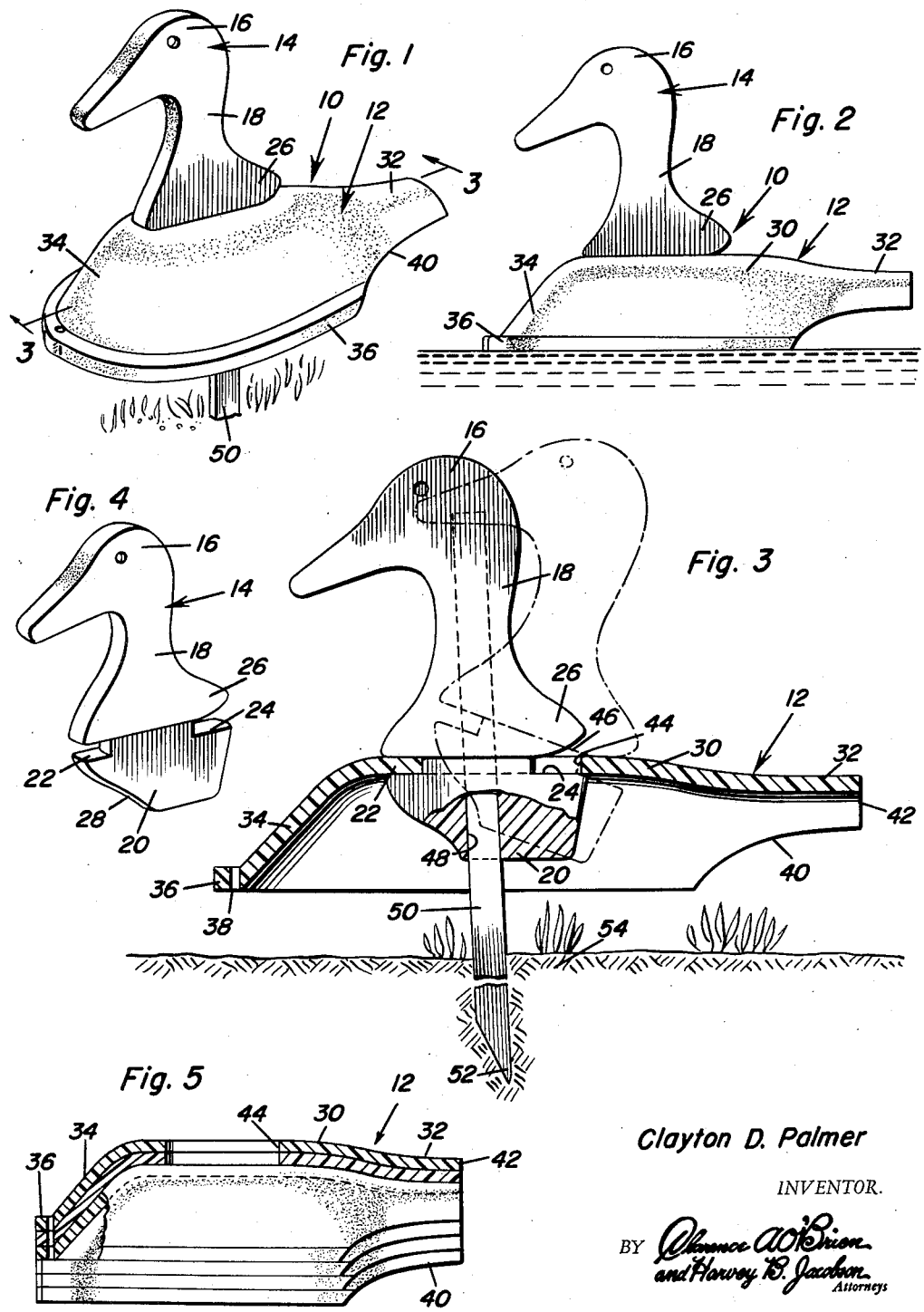
Clayton D. Palmer
INVENTOR.

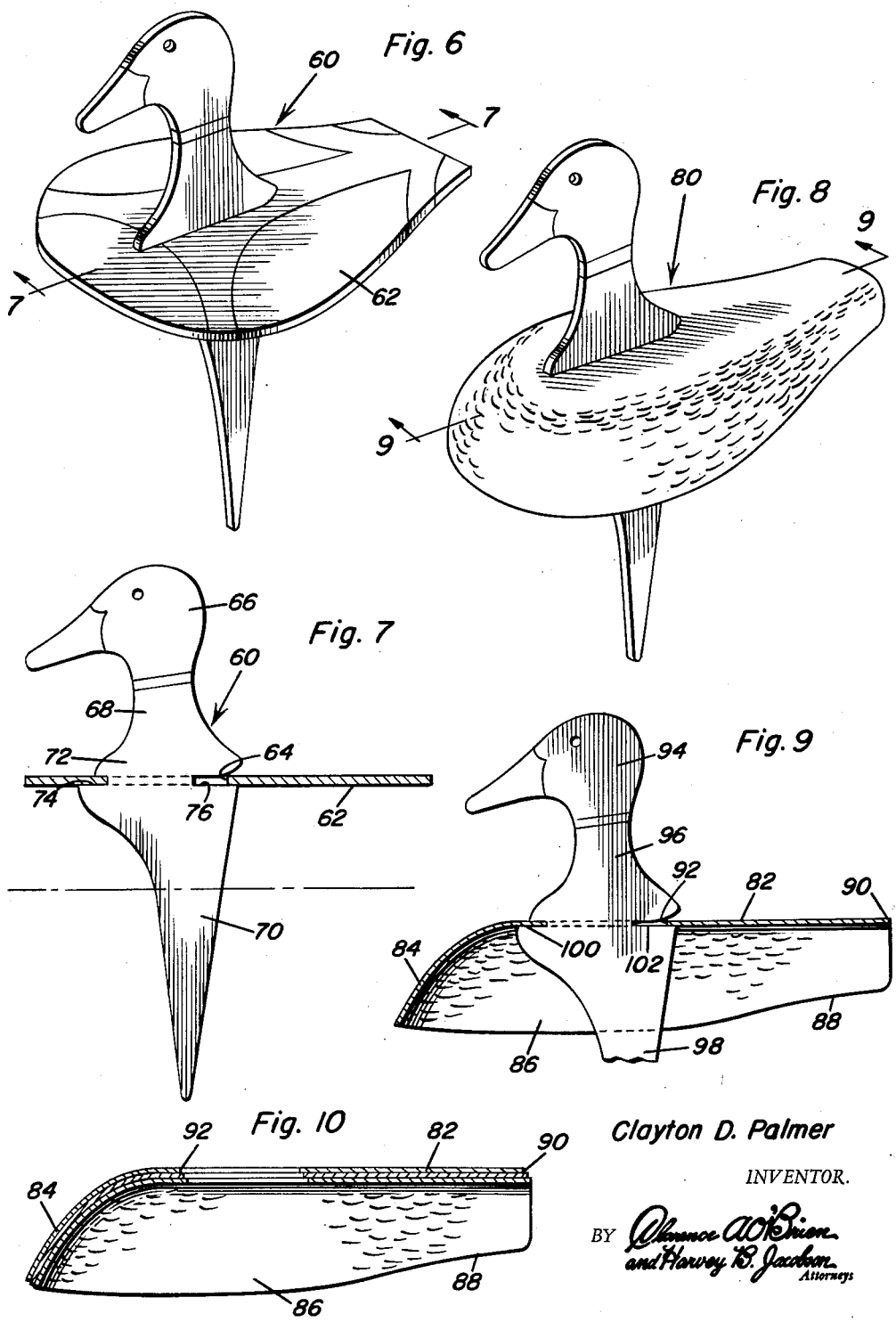

3,029,541
DECOY
Clayton D. Palmer, 316 W. College St., Albert Lea, Minn.
Filed Feb. 26, 1959, Ser. No. 795,709
3 Claims. (Cl. 43—3)

The present invention generally relates to a decoy and more particularly to a decoy of knockdown construction and which may be used in the field or on water.

The primary object of the present invention is to provide a duck or goose decoy of knockdown construction for field use or water use which closely resembles a bird which it is to attract and which may be made of various lightweight materials with the same being provided with a depending pointed element for insertion into the ground surface for anchoring the decoy in place.

Briefly, the present invention incorporates a body portion and a head portion which are detachable from each other with the head portion extending through a slot in the body portion and being interlocked therewith and with the head portion having a pointed stick or stake connected therewith which may be inserted in the ground or which may be used for attachment of a weight for anchoring the decoy whether it is used in the field or in the water.

Another object of the present invention is to provide a decoy which is simple in construction, easy to use, extremely effective in use and relatively inexpensive to manufacture.

A further object of the present invention is to provide a decoy which is light in weight and constructed of knockdown construction so that the same may be transported in a compact condition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the decoy of the present invention with the pointed stick in the ground;

FIGURE 2 is a side elevation of the decoy of the present invention floating on the water;

FIGURE 3 is a longitudinal, vertical sectional view taken substantially upon a plane passing along section line 3—3 of FIGURE 1;

FIGURE 4 is a perspective view of the head employed in the invention;

FIGURE 5 is a side elevation of a plurality of body portions fastened together with certain of the body portions being shown in section for illustrating the relationship of the components thereof;

FIGURE 6 is a perspective view of a modified form of the invention;

FIGURE 7 is a longitudinal, vertical sectional view taken substantially upon a plane passing along section line 7—7 of FIGURE 6 illustrating the structural details of this form of the invention;

FIGURE 8 is a perspective view of another form of the invention;

FIGURE 9 is a longitudinal, vertical sectional view taken substantially upon a plane passing along section line 9—9 of FIGURE 8 illustrating the structural details of this form of the invention; and FIGURE 10 is a longitudinal sectional view taken of a plurality of body portions in nested relation with the body portions being those employed in the form of the invention illustrated in FIGURES 8 and 9.

Referring now particularly to FIGURES 1-5 of the drawings, the numeral 10 generally designates the decoy of the present invention which includes a body portion generally designated by the numeral 12 and a head portion generally designated by the numeral 14. The body portion 12 and the head portion 14 are constructed of expanded polystyrene and are very light and durable.

The head portion 14 is provided with a head forming element 16 and a neck 18 extending downwardly therefrom both of which have considerable thickness and which may be decorated externally to appear like the head of a duck or goose. The lower end of the neck 18 is provided with a projecting attaching plate 20 having a notch or slot 22 in the forward edge thereof and a notch or slot 24 in the rear edge thereof which slots are in alignment with each other and are arranged at the juncture with the outwardly flared portion 26 of the lower end of the neck 18. The forward edge of the attaching plate or member 20 is upwardly curved or inclined as designated by the numeral 28 for a purpose described hereinafter.

The body portion 12 includes an inverted hollow main body member 30 with a narrowed tail portion 32 and a downwardly inclined forward or breast portion 34. The breast portion 34 and the main body portion 30 are provided with a flange 36 thereon which has horizontal upper and lower surfaces. The front end of the flange 36 is provided with an opening 38 for receiving a tie string or anchor string or the like. The rear edges of the main body portion 30 extend upwardly in a curve which is concave and designated by the numeral 42. The flange 36 is horizontal and the incline of the side portions of the main body portions 30 and also the breast portion 34 is approximately 38° which provides for proper nesting of the main body portion 12 when one is stacked upon the other thus eliminating the tendency of the stack to creep forwardly since they are held in place both laterally and longitudinally due to the curvature of the main body portion and the tail portion and the breast portion with the flanges 36 engaging each other as illustrated in FIGURE 5.

The main body portion 30 is provided with a longitudinally elongated slot 44 for receiving the attaching plate 20. The slot 44 is of less length than the attaching plate 20. However, in assembling the head 14 with the body 12, the head 14 is tilted to the dotted line position illustrated in FIGURE 3 at which time the rear edge of the slot 44 is engaged in the notch or slot 24 with the rounded rear corner 46 of the neck 18 engaging the top surface of the body 12. The head 14 is then rotated forwardly wherein the relieved portion or upwardly inclined portion 28 permits the attaching plate 20 to proceed downwardly through the slot 44 until such time as the forward edge of the slot 44 has become aligned with the forwardly facing or opening slot 22 whereupon the head can then be shifted forwardly which will not completely disengage the rear edge of the slot 44 from the notch 24 thus locking the head 14 to the body. Inasmuch as all of the structure is made of expanded polystyrene, the dimensional relationships are such that the notches 22 and 24 will frictionally engage the body 12 and especially the notch 22 will frictionally engage the forward edge of the slot 44 thus locking the head 14 to the body 12.

The head 14 is provided with an elongated vertically disposed slot 48 for receiving an elongated wooden stake 50 having a pointed lower end 52 for insertion into the ground surface 54 for anchoring the decoy in place. With this construction, the decoy may be easily anchored in place and easily disassembled for storage in a relatively compact area for ease of transportation to and from the hunting area. The device is equally useful on land as illustrated in FIGURES 1 and 3 or in water as illustrated in FIGURE 2 since the construction of the device provides for extreme light weight construction which is floatable upon the water surface.

The head and body may be constructed of various sizes and the stick or stake 50 may be permanently attached to the head or detachable by frictional engagement in the socket 48 provided therefor.

Referring now particular to FIGURES 6 and 7, the numeral 60 generally designates a modified decoy of the present invention which includes a flat plate 62 being cut to conform to the plan view of a duck or goose and which is provided with a longitudinal slot 64 in the longitudinal center thereof and adjacent the forward end for receiving a head portion 66 which has a depending neck portion 68 and an elongated pointed shank 70 at the lower end thereof. The depending neck portion is provided with an outwardly flared enlarged portion 72 having a forward notch or slot 74 and a rear notch or slot 76 for engagement with the slot 64 in the plate 62. The notches or slots 74 and 76 are interlocked with the slot 64 in substantially the same manner as described in connection with the device of FIGURES 1–5. The head portion 66 as well as the plate forming the main body portion 62 are colored to conform with various types of ducks, geese or the like and this form of the invention may also be used in the field by inserting the pointed shank 70 into the ground surface or in the water by providing an anchor weight attached to the depending shank 70 by a flexible string, line or the like.

FIGURES 9–10 illustrate another form of the invention which is generally designated by the numeral 80 and includes a hollow main body portion 82 having a downwardly inclined forward breast portion 84 and downwardly inclined side wall portions 86 which curve upwardly as designated by the numeral 88 into a flat tail end portion 90. The main body portion 82 is provided with a longitudinally extending slot 92 for receiving a head portion 94 similar to the head portion 66 in FIGURE 7 and which includes a depending neck portion 96, a pointed shank 98 and a forwardly opening slot 100 and a rearwardly opening slot 102 for engagement with the slot 92 in the main body portion 82 in substantially the same manner as in the construction of FIGURES 6 and 7 and in FIGURES 1–5.

The form of the invention illustrated in FIGURES 8–10 has a body of aluminum or plastic with the device of FIGURES 6 and 7 being also possibly constructed from plywood or the like. In each instance, the materials are lightweight and relatively inexpensive and also relatively long lasting. The bodies are oversized in relation to actual live ducks and geese and for field use, the head and neck should be considerably above the body since this is a first portion of the decoy that would be viewed as the birds approach and then the bodies are subsequentially observed. Thus, it is extremely desirable that the heads be prominent and thus project above the bodies more than in an actual bird.

The foregoing is considered as illustrative only of the principles of the invention. Further since numerous modifications and changes will readily occur to one skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable knockdown decoy comprising a body section in the form of a substantially flat plate and marginally contoured to imitate the plan outline of a dock, said plate being provided in a median portion thereof and at a point between the forward leading edge and the midportion between the forward and rearward ends with a slot of a prescribed length, a onepiece head section having a head and associated neck adapted to assume a position perpendicular to the plate and marginally delineated to provide the desired silhouetted representation of the ducks' head and neck, said neck having a vertically elongated coplanar shank, the shank being gradually decreased in width from the top to the bottom to provide an anchoring point, the rearward edge of the shank being linearly straight, the forward edge of the shank having its major portion generally straight and its upper portion curving upwardly and forwardly to a point of junctional connection with the bottom of said neck, the forward edge at the juncture of the neck and the shank having a first notch whose lower edge portion projects beyond the terminal of the upper edge portion, the junctional portion between the top of the shank and neck at the rear edge portion having a second notch deeper than the first notch with the upper edge portion of the mouth of the notch flared upwardly, said shank passing through said slot, the distance between the crotch portions of the respective notches being less than the length of the slot, and the top of the shank at the juncture of the shank and neck being of a length greater than the length of the slot.

2. A portable knockdown decoy embodying a body section comprising a plate marginally contoured to imitate a duck, said plate having a median portion provided with a slot of a predetermined length, a complemental one-piece head section embodying a head, complemental neck and an elongated shank coplanar with each other and adapted to assume a usable position perpendicular to the plane of the plate, said shank gradually decreasing in width from an upper end thereof and defining and providing a ground penetrating point, said shank having a rearward edge which is straight from end to end, having a forward edge the lower and median portion of which is generally straight and the upper portion of which is curved upwardly and forwardly to a point of junctional connection with the bottom portion of the neck, the forward edge of said head section at the juncture of the neck and shank having a first notch for reception of a forward end portion of said slot, said notch being of a width approximating the thickness of the portion of the plate which is seated therein, the junctional portion between the upper end of the shank and neck at the rear edge of said head section having a second notch deeper than the first named notch and also of a width corresponding approximately with the thickness of that portion of the plate which is insertable and retained in the notch, the lower edge of said second notch being straight from end to end, the upper edge of said notch having that end thereof adjacent the mouth of the notch curved upwardly and away from the top surface of the plate to facilitate the step of angling and inserting the shank into and removing the shank from said slot, said shank passing through said slot, the distance between the crotch portions of the respective notches being less than the length of the slot, and the top of the shank at the juncture of the shank and neck being of a length greater than the length of the slot.

3. A decoy comprising a floatable body section of inverted hollow duck shape having downwardly inclined side and front portions marginally bordered by a horizontally disposed outstanding flange horseshoe-shaped in plan, said body section having a longitudinal slot along the longitudinal center thereof and adjacent the forward downwardly inclined end, and a head section detachably engaged with the body section and including a depending neck portion having a vertical plate extending through said slot, said plate constituting a shank and having flat vertical sides and being of a cross-section less than the cross-section of said neck portion, the forward and rearward edges, respectively, of the head section at the juncture between the plate and the neck portion including a forwardly opening notch and a rearwardly opening notch for receiving and engaging the respective end marginal edges of the slot whereby the head section is capable of being engaged with the slot by initial rearward tilting movement for engaging the rearwardly opening notch with the rear edge of the slot, subsequently swinging the head section forwardly until both of the notches are in a horizontal plane and alignment with the coacting ends of the slot thereby enabling the notches and neck and shank to be engaged with the body section by means of the marginal edges of the slot by simply sliding the head section relative to the body section, said head section having a vertically elongated socket formed therein with the socket extending from the lower edge of the plate vertically and upwardly through the neck portion to a point adjacent the upper end of the head section, and an elongated pointed stick slidably and removably received within the socket with the lower end of the stick projecting below the body portion for insertion into the ground surface and having as an anchor for the decoy, said vertical plate having a forwardly and upwardly inclined marginal edge providing clearance and permitting tilting of the head section relative to the body section while the plate is being inserted into or removed from the slot, the rear terminal of the upper edge of the rear notch being longitudinally curved and thus flared upwardly to allow for and facilitate rocking engagement of the upper wall of the notch with the top surface of the body section rearwardly of the slot during the tilting movement of the head portion when assembling and disassembling the head section in relation to the body section.

References Cited in the file of this patent

UNITED STATES PATENTS

| | | |
|---|---|---|
| 735,314 | Symns | Aug. 4, 1903 |
| 1,316,566 | Fauble | Sept. 23, 1919 |
| 2,441,753 | Carpenter | May 18, 1948 |
| 2,755,588 | Johnson | July 24, 1956 |
| 2,783,572 | Rohan | Mar. 5, 1957 |
| 2,893,154 | McKee | July 7, 1959 |